Sept. 14, 1954 L. F. ELKINS 2,688,868
SPECIFIC GRAVITY METER
Filed Oct. 12, 1949

INVENTOR.
LINCOLN F. ELKINS
BY
Oberlin & Limbach
ATTORNEYS.

Patented Sept. 14, 1954

2,688,868

UNITED STATES PATENT OFFICE 2,688,868

SPECIFIC GRAVITY METER

Lincoln F. Elkins, Oklahoma City, Okla., assignor to Continental Oil Company, Ponca City, Okla., a corporation of Delaware Application October 12, 1949, Serial No. 120,839

4 Claims. (Cl. 73—33)

This invention relates, as indicated, to specific gravity meters and relates particularly to meters for the determination of the specific gravity of fluids whether liquid or gaseous.

In the more specific embodiment of my invention, the specific gravity meter forming the subject matter of my invention is designed for use in determining the specific gravity of fluids in pressure vessels such as are commonly employed in petroleum refineries where it is desirable to determine the specific gravity of a fluid whether liquid or gaseous in a pressure vessel without the necessity of taking an actual sample and determining specific gravity in the conventional way.

The meters of my invention are further advantageous in that they provide a constant record of the specific gravity of the fluid under observation so that a continuous record may be kept.

It is a principal object of this invention to provide a specific gravity meter having all of the above enumerated desirable characteristics.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
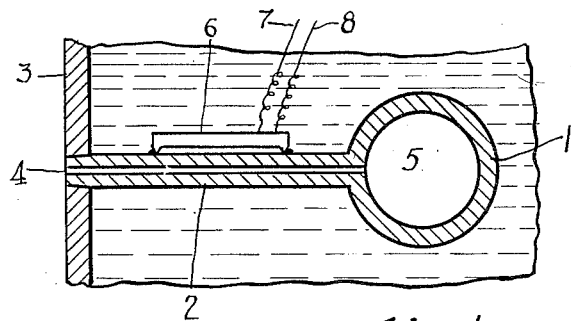
Figure 2:
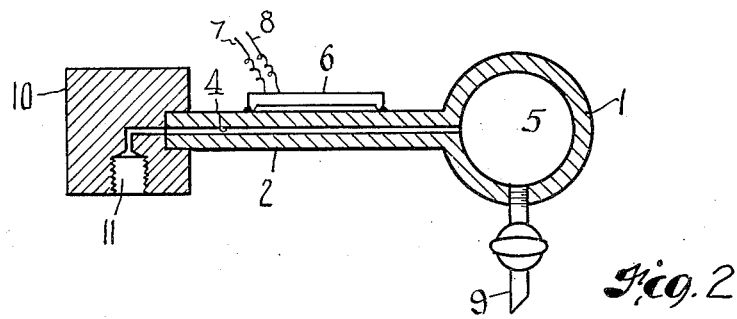
Figure 3:
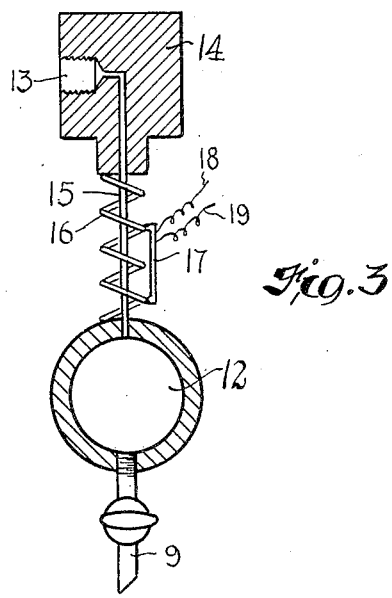

In said annexed drawing:

Fig. 1 is an illustration of one embodiment of a specific gravity meter constructed in accordance with the principles of my invention with the operative portion of the meter shown projecting into a body of fluid which may be under pressure and whose specific gravity is to be determined;

Fig. 2 illustrates a modified form of construction which is particularly suitable for use in determining the specific gravity of a fluid which is introduced into the apparatus illustrated rather than surrounding such apparatus as in the previous figure; and Fig. 3 is still another modified form of construction in accordance with my invention, the particular change being with regard to the manner in which a portion of the device is resiliently supported.

Referring now more specifically to the drawing and more especially to Fig. 1, the device there illustrated comprises a hollow body member 1 which is for convenience spherical in form and which is terminally supported on a thin flexible hollow stem 2, which is supported at the other end in the wall 3 of a pressure vessel, for example, the body 1 being located within such vessel so that the body 1 is surrounded by the fluid whose specific gravity is to be determined. In the illustrated embodiment of my invention as shown in Fig. 1, the stem 2 is provided with an axially extending passage 4 by which communication may be had to the interior 5 of the body 1 for the purpose of introducing to such body a fluid of any desired character for the purpose of varying the weight of such body.

Secured to the flexible stem 2 is a strain gauge 6 of the type which employs an electrical filament, the electrical resistance of which varies in accordance with the strain imposed thereon. Since the present invention is not concerned with the specific construction of the strain gauge 6, it is believed sufficient to state that it may be made in accordance with the teachings of any of the following patents: 2,360,493; 2,363,181; 2,344,642; 2,340,146; 2,316,203; 2,334,843 and Re. 22,589. Strain gauges of this character carry an electrical filament which as indicated is of such nature that its electrical resistance varies in accordance with the physical strain on the filament. In Fig. 1, the strain gauge 6 comprises a bar on the body of which would be secured such electrical filaments with the bar secured to the flexible member 2 in such a fashion that the filaments carried by the strain gauge would be physically strained proportionately to the flexure of the member 2. The filament has not been illustrated in detail on the bar of the strain gauge 6 other than to indicate leads 7 and 8 extending to the filaments on such bar.

In use, the strain gauge as employed in connection with the device illustrated in Fig. 1 will need to be calibrated in accordance with the specific gravity of the particular fluid introduced into the space 5 of the body 1. Thereafter, the strain gauge will indicate the specific gravity of any fluid in which the device is immersed without recalibration. If the fluid under study is relatively heavy, then the space 5 of the body 1 may be filled with a light fluid such as air and the buoyant effect of the body in flexing the member 2 and consequently imposing a strain on the filament of the strain gauge 6 is relied upon for the purpose of indicating variations in the specific gravity of the fluid under study. On the other hand, it is within the contemplation of my invention to introduce to the body 1 a heavy fluid such as mercury by which the weight of the body may be increased substantially so that its effective weight per unit volume is greater than that of the fluid under study, in which event the tendency of the body to sink, likewise resulting in a flexure of the supporting bar 2 and a strain on the filament of the strain gauge 6 will be produced and variations in the density or specific gravity of the fluid under study will be likewise reflected. As to whether the body 1 is to be made buoyant or heavier than the fluid within which it is submerged will depend largely upon the nature of the fluid under study and other conditions which may obtain in the vessel within which the gauge is installed.

The body 1, instead of being hollow, as indicated in the drawing, may for certain types of construction be solid, in which case the specific gravity of the material used for the formation of the solid body 1 should be substantially different from the specific gravity of the material under test so as to provide the greatest possible sensitivity for the instrument. Any solid material thus employed for this purpose should, of course, be inert and not subject to change as by absorption or adsorption when such body is immersed in the fluid being tested.

Instead of having the body 1 project into the mass of fluid whose specific gravity is to be determined, as illustrated in Fig. 1, it is within the contemplation of my invention to provide the modification as illustrated in Fig. 2 which is identical with that illustrated in the previous figure so that like numerals will be employed to designate like parts except that in the construction illustrated in Fig. 2, the body 1 is provided with a valved outlet 9 by which the contents of the body 1 may be discharged. Also the stem 2 may be connected either to the outside surface of the wall 3 of the pressure vessel or to a block generally indicated at 10 which is provided with passage 11 through which the body 1 may be placed in communication as by conduits or the like with the body of fluid whose specific gravity is to be determined. When employing the construction illustrated in Fig. 2, the fluid under pressure admitted through the passage 11 to the body 1 is bled off through the valve outlet 9 until a truly representative sample is present in the body 1, whereupon the valve passage 9 will be closed and the weight of the fluid contained in the body 1 will, therefore, be reflected in a downward deflection of the end of the cantilever beam 2 by which the body is supported, such deflection being reflected in a strain on the filament of the strain gauge 6, whereby through proper calibration data the specific gravity of the material under study in the body 1 may be determined.

The embodiment of my invention illustrated in Fig. 3 is generally similar to that illustrated in Fig. 2, excepting that the body 12, which corresponds to the body 1 of the previous illustrations, is connected for fluid supply purposes to the passage 13 of a block 14, which corresponds to block 10 of the previous figure, by means of a small flexible conduit such as a thin rubber tube 15. The main weight of the body 12 is supported by means of a spring 16 so that as the weight of the body 12 varies, the deflection of the spring 16 will be varied proportionately. A strain gauge 17 of the character previously described, i. e., like the strain gauge 6 of the previous figures, is secured to the spring 16 so as to provide variations in an electrical parameter of a circuit, which includes the strain gauge filament by means of leads 18 and 19, which is proportionate to a variation in the physical deformation of the spring 16, or more accurately, in the weight of the predetermined mass of the material under study which is contained in the body 12.

While the previously indicated utility of my improved specific gravity meters has been indicated as being in connection with the observance of changes in the specific gravity of fluids in pressure vessels such as those commonly employed in petroleum refineries, it will be evident from the foregoing description that the instruments described have a wider field of use. It is also within the contemplation of my invention to use the constructions illustrated in Figs. 2 and 3, for example, in a mode slightly different from that which has been explained. For example, the fluid under study may be permitted to flow continuously through the instrument and after there has been an appropriate adjustment of the operating conditions so as to eliminate variables due to differences in rate of flow, temperature and other variables due to changes in the environment within which the instrument is used, the instrument may be used for the purpose of providing a continuous record of variations in the specific gravity of the fluid caused to flow therethrough.

The instrument may be constructed of any suitable material, the nature of which will be determined largely by the character of the material to be studied and the conditions under which the instrument is to be used. The principal element with respect to which the nature of the material from which it is formed is critical is the resilient member such as Nos. 2 and 16 by which the body is resiliently supported. A resilient spring steel or like material should be used for this purpose. Preferably a material whose stress strain curve is a substantial straight line should be used.

The strain gauge may be secured to the resilient member at its points of contact by any suitable bonding agent, as, for example, a plastic cement, or it may be soldered or welded thereto.

Other modes of applying the principle of the invention may be employed, change being made as regards the details described, provided the features stated in any of the following claims or the equivalent of such be employed.

I therefore particularly point out and distinctly claim as my invention:

1. In a specific gravity meter for determining the specific gravity of fluids, the combination of a hollow body member having provision for introducing a fluid into said body member and withdrawing the same therefrom whereby the apparent density of the body member may be varied, a flexible support for said body member which includes a passageway for the introduction into said body member the fluid the specific gravity of which is to be determined, a filament whose electrical resistance varies with its strain carried by said flexible support so as to be deformed therewith, and leads extending from said filament whereby variations in the electrical resistance of said filament may be measured and the specific gravity of the fluid determined.

2. In a specific gravity meter for determining the specific gravity of fluids, a closed hollow body member of predetermined volume adapted to contain a fluid therein, a flexible support for said hollow body member which includes a passageway for the introduction into said body member the fluid the specific gravity of which is to be determined, means for introducing fluid into said hollow body member and withdrawing the same therefrom whereby the apparent density of the body member may be varied, a filament whose electrical resistance varies with its strain carried by said flexible support so as to be deformed proportionately to the deflection of the latter and leads extending from said filament whereby variations in its electrical resistance may be measured and the specific gravity of the fluid determined.

3. In a specific gravity meter for determining the specific gravity of fluids, a closed hollow body member of predetermined volume adapted to contain a fluid therein, a flexible support for said hollow body member having a conduit therein communicating with said hollow body member whereby fluid may be introduced into said body member and withdrawn therefrom thereby varying the apparent density of the body member, a filament whose electrical resistance varies with its strain carried by said flexible support so as to be deformed proportionately to the deflection of the latter and leads extending from said filament whereby variations in its electrical resistance may be measured and the specific gravity of the fluid determined.

4. In a specific gravity meter for determining the specific gravity of fluids, a closed hollow body member of predetermined volume adapted to contain a first fluid, a flexible member adapted to support said hollow body member in a second fluid said flexible support member having a conduit therein communicating with said hollow body member whereby the first fluid may be introduced into said body member and withdrawn therefrom thereby varying the apparent density of the body member, a filament whose electrical resistance varies with its strain carried by said flexible support member so as to be deformed proportionately to the deflection of the latter and leads extending from said filament whereby variations in its electrical resistance may be measured and the specific gravity of the second fluid determined.

References Cited in the file of this patent

UNITED STATES PATENTS

| Number | Name | Date |
|---|---|---|
| 682,382 | Gray | Sept. 10, 1901 |
| 1,449,153 | Spurrier | Mar. 20, 1923 |
| 1,546,702 | Bailey | July 21, 1925 |
| 2,235,064 | Cloud | Mar. 18, 1941 |
| 2,460,503 | Howe | Feb. 1, 1949 |
| 2,582,886 | Ruge | Jan. 15, 1952 |

FOREIGN PATENTS

| Number | Country | Date |
|---|---|---|
| 266,099 | Germany | Oct. 18, 1913 |